US012706001B2

(12) United States Patent
Robinson et al.

(10) Patent No.: US 12,706,001 B2
(45) Date of Patent: Aug. 11, 2026

(54) BI-DIRECTIONAL COMMUNICATIONS FOR VEHICLE AND VIRTUAL GAME SITUATIONS

(71) Applicant: Red Six Aerospace Inc., Orlando, FL (US)

(72) Inventors: Daniel Augustine Robinson, Marina Del Rey, CA (US); Glenn Thomas Snyder, Venice, CA (US); Max M. Marosko, III, Coupland, TX (US); Geoffrey Edward Lohmiller, Huntington Beach, CA (US)

(73) Assignee: RED SIX AEROSPACE INC, Orlando, FL (US)

( * ) Notice: Subject to any disclaimer, the term of this patent is extended or adjusted under 35 U.S.C. 154(b) by 376 days.

(21) Appl. No.: 18/216,935

(22) Filed: Jun. 30, 2023

(65) Prior Publication Data

US 2024/0005812 A1 Jan. 4, 2024

Related U.S. Application Data

(60) Provisional application No. 63/357,182, filed on Jun. 30, 2022.

(51) Int. Cl.

*G09B 9/00* (2006.01)
*G06F 3/01* (2006.01)

(Continued)

(52) U.S. Cl.

CPC .............. *G09B 9/003* (2013.01); *G06F 3/011* (2013.01); *G06T 15/10* (2013.01); *G06T 19/006* (2013.01);

(Continued)

(58) Field of Classification Search

CPC ........ G09B 9/003; G09B 9/302; G09B 9/085; G09B 19/165; G09B 9/44; G06T 15/10; G06T 19/006

See application file for complete search history.

(56) References Cited

U.S. PATENT DOCUMENTS 5,838,262 A 11/1998 Kershner
6,826,458 B2 11/2004 Horvath (Continued)

FOREIGN PATENT DOCUMENTS

IN 202041044232 9/2021

OTHER PUBLICATIONS

Awe, "ThinVR: A compact, 180 degree FOV, VR display" youtube video recorded at AWE Online 2020, retrieved from <<https://www.youtube.com/watch?v=t9JW_o0CoQ0>> on Jun. 26, 2023.

(Continued)

*Primary Examiner* — Steve Rowland
(74) *Attorney, Agent, or Firm* — FisherBroyles LLC

(57) ABSTRACT

A method, includes receiving training exercise data representative of interactions between at least a real aircraft and a virtually presented aircraft that participated in a simulated training exercise, wherein the exercise data is selected from the group consisting of tracked geospatial locations of the real aircraft, tracked geospatial locations of the virtual aircraft, tracked geospatial locations of a launched virtual missile from the real aircraft, a target lock indicating that a weapons system of the real vehicle had a weapons target lock on the virtual aircraft, an indication that the pilot-initiated launch of a weapon from the vehicle's weapons system and an indication of an explosion based at least in part on an estimated intersection of the virtual weapon and virtual aircraft by the simulation computing system and (Continued)

presenting the training exercise data as a three-dimensional battlefield that adapted to be paused and played.

10 Claims, 5 Drawing Sheets

(51) Int. Cl.
*G06T 15/10* (2011.01)
*G06T 19/00* (2011.01)
*G09B 9/08* (2006.01)
*G09B 9/30* (2006.01)
*G09B 9/16* (2006.01)
*G09B 9/44* (2006.01)

(52) U.S. Cl.
CPC ............. *G09B 9/085* (2013.01); *G09B 9/302* (2013.01); *G09B 9/165* (2013.01); *G09B 9/44* (2013.01)

(56) References Cited

U.S. PATENT DOCUMENTS 6,952,630 B2 10/2005 Hedrick
8,463,463 B1 6/2013 Feldmann
8,686,900 B2 4/2014 Whitehead
9,019,128 B1 * 4/2015 Kim ....................... G01C 23/00 701/14
9,099,009 B2 8/2015 Sowadski
9,555,337 B2 1/2017 Garlington
9,759,917 B2 9/2017 Osterhout
9,892,489 B1 * 2/2018 Roggendorf .............. G06T 3/60
10,025,096 B2 7/2018 Yoon
10,114,127 B2 * 10/2018 Brown .................... F41G 3/165
10,204,453 B2 2/2019 Sharma
10,254,544 B1 4/2019 Melzer
10,528,126 B2 1/2020 Trythall
10,585,471 B2 3/2020 Reichow
10,713,960 B1 7/2020 Ziarnick
10,822,108 B2 11/2020 Chavez
10,827,165 B2 11/2020 Ratcliff
10,884,525 B1 1/2021 Vonsik
10,948,740 B2 3/2021 Ratcliff
10,977,493 B2 4/2021 Speasl
10,996,473 B2 5/2021 Yang
11,601,638 B2 3/2023 Ratcliff
2002/0015195 A1 2/2002 Sugano
2002/0053983 A1 5/2002 Chamas
2003/0025714 A1 2/2003 Ebersole
2005/0231419 A1 10/2005 Mitchell
2006/0146048 A1 7/2006 Wright
2006/0178758 A1 8/2006 Koriat
2006/0181483 A1 8/2006 Ari
2006/0271249 A1 11/2006 Testrake
2007/0005199 A1 1/2007 He
2008/0319647 A1 12/2008 Dehn
2009/0099824 A1 4/2009 Falash
2009/0112813 A1 4/2009 Jung
2009/0112817 A1 4/2009 Jung
2009/0113298 A1 4/2009 Jung
2010/0096491 A1 4/2010 Whitelaw
2010/0125412 A1 5/2010 Suddreth
2010/0238161 A1 9/2010 Varga
2010/0283635 A1 11/2010 Brinkman
2010/0295754 A1 11/2010 Cernasov
2011/0106447 A1 5/2011 Wise
2011/0183301 A1 7/2011 Turner
2012/0156653 A1 6/2012 Wokurka
2012/0176497 A1 7/2012 Shadmi
2012/0194552 A1 8/2012 Osterhout
2012/0287040 A1 11/2012 Moore
2012/0303252 A1 11/2012 Schwinn
2013/0002525 A1 1/2013 Foote
2013/0038510 A1 2/2013 Brin
2013/0050070 A1 2/2013 Lewis
2013/0162632 A1 6/2013 Varga
2013/0280678 A1 10/2013 Towers
2014/0080099 A1 3/2014 Sowadski
2014/0113255 A1 4/2014 Lechner
2014/0127655 A1 5/2014 Taylor
2014/0274564 A1 * 9/2014 Greenbaum ......... A63B 21/225 482/5
2014/0306866 A1 10/2014 Miller
2015/0081197 A1 3/2015 Gaertner
2015/0187224 A1 7/2015 Moncrief
2015/0234455 A1 8/2015 Lavalle
2015/0294505 A1 10/2015 Atsmon
2016/0019808 A1 1/2016 Chavez
2016/0027336 A1 1/2016 Towers
2016/0165409 A1 6/2016 Bulut
2016/0188857 A1 6/2016 Semba
2016/0195923 A1 7/2016 Nauseef
2016/0293133 A1 10/2016 Dutt
2017/0025031 A1 * 1/2017 Dreyer ..................... G09B 9/12
2017/0030735 A1 2/2017 Mohideen
2017/0064157 A1 3/2017 Lawrence
2017/0069214 A1 3/2017 Dupray
2017/0109562 A1 4/2017 Shroff
2017/0139205 A1 5/2017 Lee
2017/0161909 A1 6/2017 Hamanaka
2017/0186240 A1 6/2017 Alaniz
2017/0262052 A1 9/2017 Richmond
2017/0308157 A1 10/2017 Tsuda
2018/0096532 A1 4/2018 Srivastav
2018/0130260 A1 5/2018 Schmirler
2018/0155052 A1 6/2018 Lacroix
2018/0165979 A1 6/2018 Correia Gracio
2018/0190095 A1 7/2018 Leegate
2018/0253856 A1 9/2018 Price
2018/0272231 A1 9/2018 Katoh
2018/0293909 A1 * 10/2018 Lechner ................. G09B 9/006
2019/0035258 A1 1/2019 Zhang
2019/0088156 A1 3/2019 Choi
2019/0212158 A1 7/2019 Gordon
2019/0215671 A1 7/2019 Takii
2019/0228590 A1 7/2019 Kaifosh
2019/0317718 A1 10/2019 George
2019/0333396 A1 10/2019 Robinson
2020/0035019 A1 * 1/2020 Cappello ................. G06T 7/536
2020/0128902 A1 4/2020 Brown
2020/0151958 A1 5/2020 Livneh
2020/0184725 A1 * 6/2020 Venugopalan ........ G06T 19/006
2020/0349852 A1 11/2020 Dicosola
2021/0049925 A1 2/2021 Robinson
2021/0201600 A1 7/2021 Ghanbari
2022/0217322 A1 7/2022 Alfaro
2022/0223052 A1 * 7/2022 Holmes .................... G08G 5/21
2023/0108678 A1 4/2023 Robinson
2023/0113472 A1 4/2023 Gallery
2023/0215287 A1 7/2023 Augustine
2023/0334788 A1 10/2023 Zohni

OTHER PUBLICATIONS

International Search Report and Written Opinion of the International Search Authority mailed Oct. 19, 2022, in International Application No. PCT/US22/27665, 17 pages.
International Search Report mailed Dec. 17, 2021, in International Application No. PCT/US2021/057357, 3 pages.
International Search Report mailed Sep. 21, 2023, in International Application No. PCT/US2023/026698.
Michael William Gillen; A Study Evaluating if Targeted Training for Startle Effect can Improve Pilot Reactions in Handling U Unexpected Situations in a Flight Simulator; The University of North Dakota. ProQuest Dissertations Publishing, Dec. 1, 2016 (Year: 2016) 155 pages.
Qllin Krum, Ordinary Pilots Are Closer to Getting Fighter Jet-Like Augmented Reality Displays, Aug. 31, 2015, Jalopnik {https:// jalopnik com/general-aviation-pilots-closer-to-getting-fighter-jet-1-1722914390) 8 pages.
Written Opinion of the International Searching Authority mailed Dec. 17, 2021, in International Application No. PCT/US2021/ 057357, 9 pages.

(56) References Cited

OTHER PUBLICATIONS

Written Opinion of the International Searching Authority mailed Sep. 21, 2023, in International Application No. PCT/US2023/026698.
Written Opinion of the International Searching Authority mailed Feb. 11, 2025 in International Applicaiton No. PCT/US2024/056416.
International Search Report and Written Opinion of the International Searching Authority mailed Aug. 1, 2025, in International Application No. PCT/US2024/035899, 12 pages.
International Search Report and Written Opinion of the International Searching Authority mailed Sep. 15, 2025, in International Application No. PCT/US2025/035458 (pp. 1-9).

* cited by examiner

Figure 5:
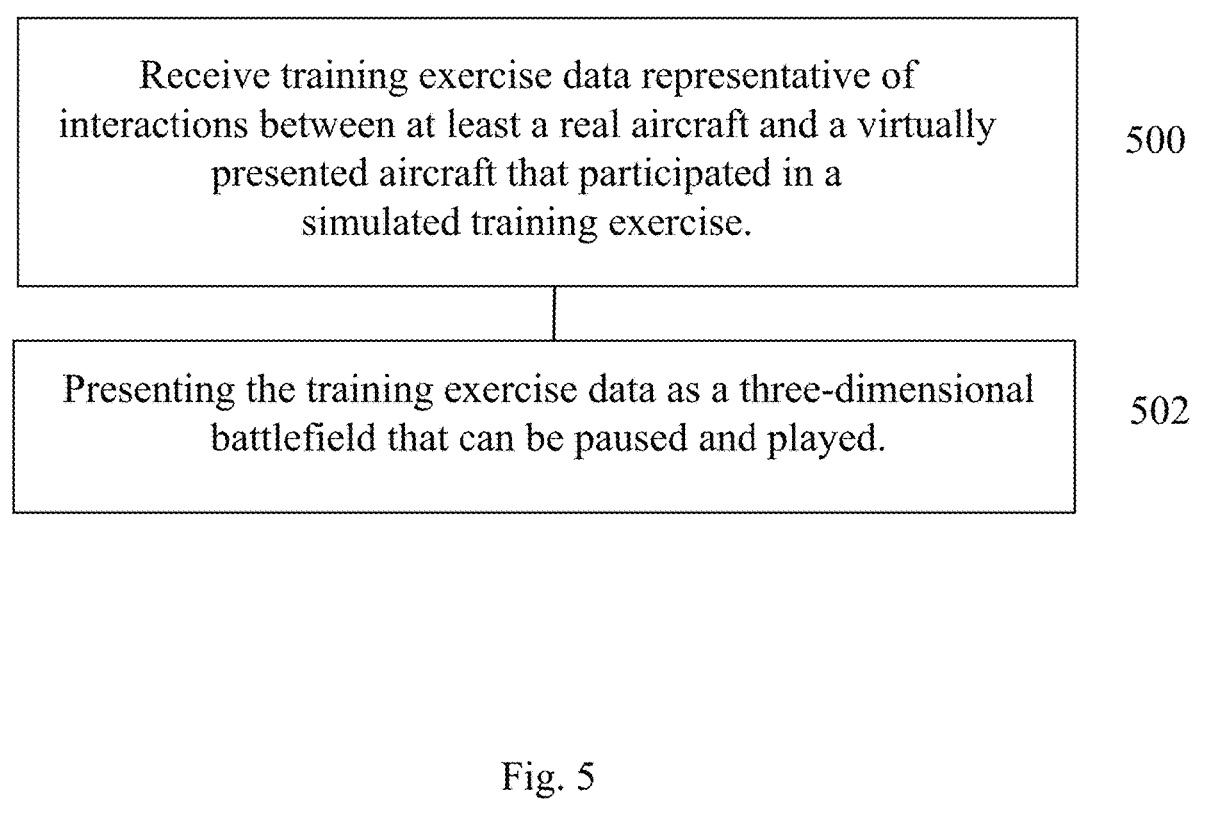

Receive training exercise data representative of interactions between at least a real aircraft and a virtually presented aircraft that participated in a simulated training exercise.

500

Presenting the training exercise data as a three-dimensional battlefield that can be paused and played.

BI-DIRECTIONAL COMMUNICATIONS FOR VEHICLE AND VIRTUAL GAME SITUATIONS

CROSS REFERENCE TO RELATED APPLICATIONS

This application claims the benefit of U.S. Provisional Patent Application 63/357,182, filed Jun. 30, 2022, the entire disclosure of which is hereby incorporated herein by reference.

FIELD OF THE INVENTION

Generally, the present disclosure relates to the field of virtual reality. More specifically, the present disclosure relates to methods, systems, apparatuses, and devices for facilitating provisioning of a virtual mixed-reality experience.

BACKGROUND OF THE INVENTION

Virtual reality may be employed in a broad variety of contexts to provide mixed reality environments. In some instances, VR platforms may incorporate vehicles wherein operators of the vehicles are able to view actual feedback mechanisms, such as display panels, gauges and the like, as well as virtual objects and events, such as explosions, enemy aircraft and the like. In instances where virtual objects are created and communicated, such as via a gaming engine, there may be data collected and communicated back to the gaming engine from a vehicle indicative of actions taken in response to the communicated virtual objects and events. Failure to utilize this feedback in a seamless manner results in an unrealistic VR environment for an operator of the vehicle.

Therefore, there is a need for improved methods, systems, apparatuses and devices for facilitating provisioning of a virtual experience that may overcome one or more of the above-mentioned problems and/or limitations.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

As described below, a virtual training environment, such as one comprising a pilot flying an aircraft, may be powered, for example, by a gaming engine. The pilot may experience a mixed reality environment in which she views a mixture of both real and virtual objects. For example, via the use of a virtual reality headset, a pilot may see both the actual environment surrounding her as well as generated virtual objects with which she can interact. For example, a pilot may look to one side and see flying next to her a real wingman. She may subsequently look straight ahead and see a virtual craft engaged in the process of simulating an in-flight refueling session for training purposes.

In addition to being able to see virtual objects, it may sometimes be preferable to enable the actual display of data on physical displays, such as cockpit mounted display surfaces, wherein the displayed data is a mixture of real sensor data and over-ride sensor data. This combination of virtual data displayed via physical devices is often referred to as synthetic reality. As described more fully below, over-ride sensor data is generated virtual data that is seamlessly integrated into actual sensor data. Once integrated, the combined data may be displayed to the pilot. Because such generated data will result in responses from the pilot, and as such responses will affect the collection of future sensor data, there is employed bi-directional communication between the gaming engine and the pilot's aircraft and aircraft sensors.

Special attention is paid to the instance wherein a training scenario seeks to simulate a missile radar lock on a target that may or may not be beyond visual range. As described below, in such an instance, bi-directional communication is employed to provide a pilot with a realistic sense of operating in such a scenario.

In accordance with an exemplary and non-limiting embodiment, a mixed reality training system for use in a live vehicle, comprises a weapon targeting sensor system integrated into the live vehicle, an over-ride sensor data input configured to receive over-ride targeting sensor data from a training simulation system, wherein the over-ride targeting sensor data is indicative of predicted sensor feedback based on a predicted interaction between the targeting sensor system and a virtual asset depicted in a virtual environment in which the live vehicle is represented, an over-ride action data input configured to receive data indicative of a vehicle operator's action in response to the over-ride targeting sensor data and a communications system configured to bi-directionally communicate the over-ride targeting sensor data and the over-ride action data between the live vehicle and training system operating the virtual environment, wherein the training system generates visual content to be presented to the operator as mixed reality content.

In accordance with an exemplary and non-limiting embodiment, a method of weapons training, comprises presenting a virtual environment in mixed reality to a pilot of a live airplane, wherein the virtual environment includes a virtual representation of an enemy airplane, causing a weapons tracking system of the live airplane to lock onto the enemy airplane and communicating an indication of the lock to a game engine for weapons tracking, receiving, by the game engine, a missile launch command from the live airplane while the lock indication remains on and presenting to the pilot, through the pilot's mixed reality head mounted display, a visual indication of the missile's flight path towards the enemy airplane and an explosion at a location coincident the position of the enemy aircraft at a time when the game engine estimates impact of the virtual missile and enemy airplane.

In accordance with an exemplary and non-limiting embodiment, a method of weapons training, comprises presenting a virtual environment in mixed reality to a pilot of a live airplane, wherein the virtual environment includes a virtual representation of an enemy airplane, receiving, at a game engine, an indication of a missile launch and state information of a weapons tracking system of the live airplane, presenting to the pilot of the live aircraft a visual indication, in a mixed reality head mounted display, of a countermeasure initiated by the enemy airplane, calculating an effectiveness of the countermeasure on the flight path of the virtual missile to generate an estimate of the likelihood of an impact of the missile with the enemy airplane and presenting a visual indication of an explosion to the pilot, in the mixed reality head mounted display, when the estimate of the likelihood of impact indicates a hit.

In accordance with an exemplary and non-limiting embodiment, a method comprises transmitting data for presenting an augmented reality image of a virtual aircraft positioned at a geospatial location to a pilot operating a real vehicle, wherein the virtual aircraft is presented through a head mounted see-through optical system, transmitting an instruction to present a target lock indication to the pilot indicating that a weapons system of the real vehicle has a weapons target lock on the virtual aircraft, wherein the weapons target lock indication is generated by a simulation computer system executing software simulating a battle scene, in which the pilot is represented, when the simulation computer system indicates that there is an indication of alignment between an ability of a weapon of the weapons system to hit the virtual aircraft, receiving an indication that the pilot has initiated launch of a weapon from the vehicle's weapons system, wherein the indication of launch initiation is communicated to the simulation computer system and the simulation computer system generates a launched weapon, transmitting data for presenting an augmented reality image to the pilot representing the launched weapon and transmitting data for presenting an augmented reality image graphically illustrated as an explosion based at least in part on an estimated intersection of the virtual weapon and virtual aircraft by the simulation computing system.

In accordance with an exemplary and non-limiting embodiment method includes receiving training exercise data representative of interactions between at least a real aircraft and a virtually presented aircraft that participated in a simulated training exercise, wherein the exercise data is selected from the group consisting of tracked geospatial locations of the real aircraft, tracked geospatial locations of the virtual aircraft, tracked geospatial locations of a launched virtual missile from the real aircraft, a target lock indicating that a weapons system of the real vehicle had a weapons target lock on the virtual aircraft, an indication that the pilot-initiated launch of a weapon from the vehicle's weapons system and an indication of an explosion based at least in part on an estimated intersection of the virtual weapon and virtual aircraft by the simulation computing system and presenting the training exercise data as a three-dimensional battlefield that adapted to be paused and played

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 5 is an illustration of an exemplary and non-limiting method.

DETAIL DESCRIPTIONS OF THE INVENTION

As used herein "over-ride sensor data" refers to synthetic data provided to a data bus prior to communication to a computational unit. As a result, operational flight plans (OFPs) may process such data as sensor data and may propagate the data throughout the displays via the OFP as described below.

Figure 1:
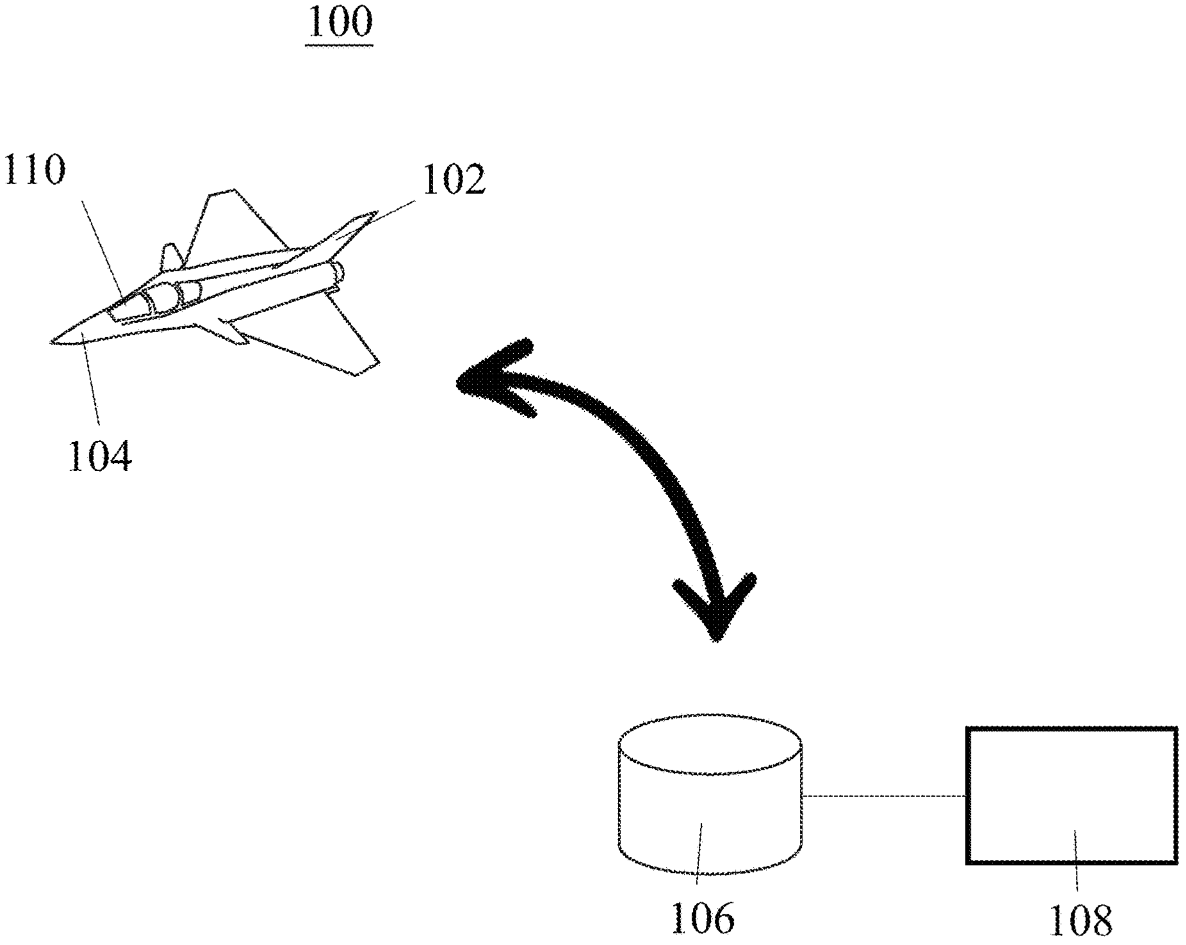
FIG. 1 is an illustration of an exemplary and non-limiting virtual reality environment.

With reference to FIG. 1, there is illustrated an exemplary and non-limiting embodiment of a bi-directional communications system 100 comprising a live vehicle 102 (e.g., aircraft) to facilitate realistic interactions in a virtual environment in which the live vehicle 102 is operating. The live aircraft 102 may have many different types of sensor systems 104 that act locally, such as a target tracking system. As illustrated, sensor systems 104 may be located within the nose of the aircraft or anywhere else within, upon or in proximity to the aircraft 102. Such sensor systems may communicate information to a centralized ground server 106 or other repository of flight information as well as to onboard display systems 110. For example information from vehicle sensors 104 such as on board radar systems, GPS units, accelerometers and the like may be communicated to an outside entity, such as a ground based server 106, to store sensor readings. In some embodiments, these sensor readings are used to power a simulation engine, such as a gaming engine 108. In some embodiments, sensor information may be communicated directly to an onboard display system 110. For example, altimeter and radar data may be displayed in cockpit displays.

Figure 2:
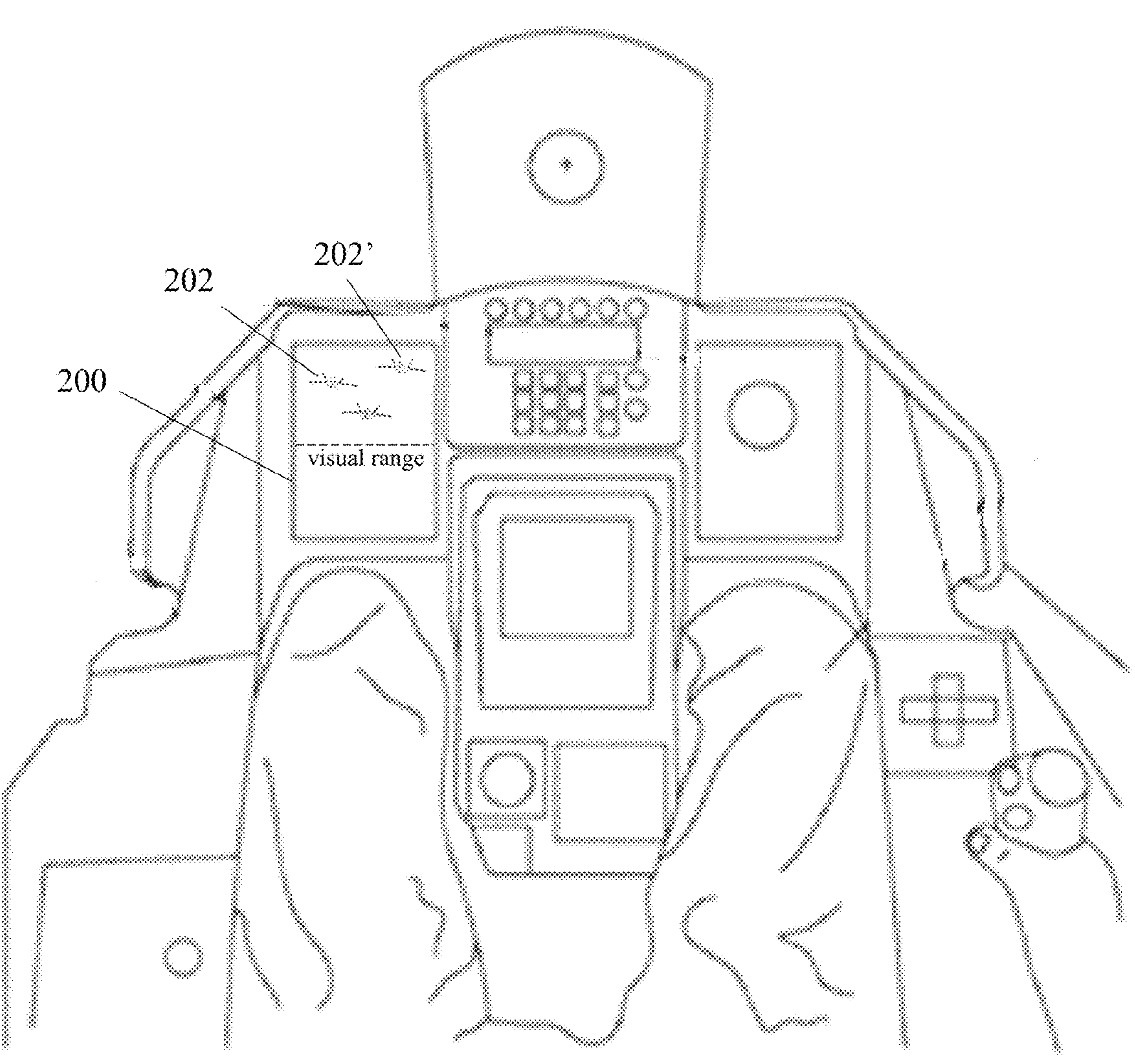
FIG. 2 is an illustration of an exemplary and non-limiting cockpit environment.
Figure 3:
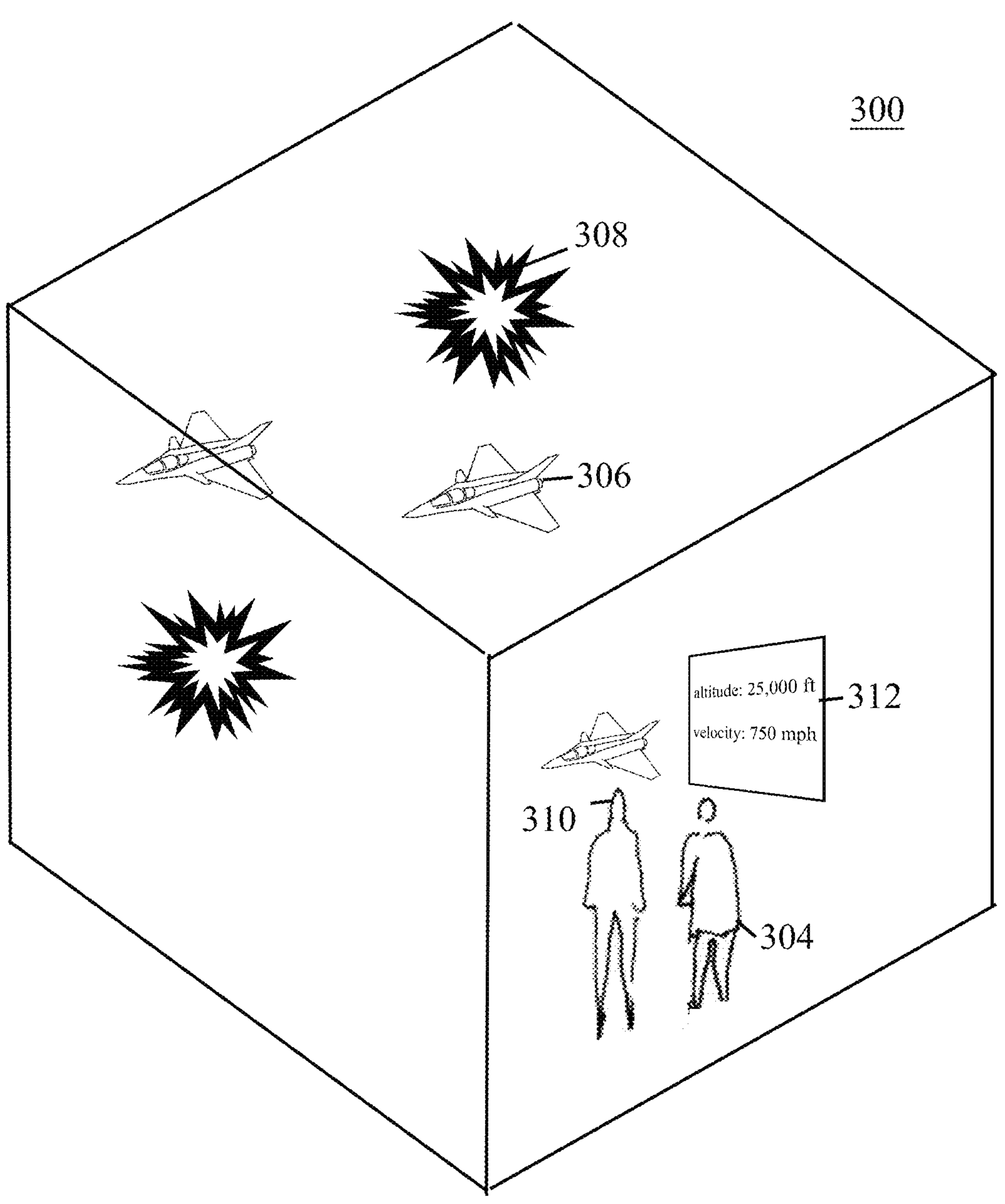
FIG. 3 is an illustration of an exemplary and non-limiting training analysis environment.

In accordance with exemplary and non-limiting embodiments, there is contemplated a hybrid system whereby cockpit displays display sensor data that has been augmented, such as by the gaming engine. For example, with reference to FIG. 2, there is illustrated an exemplary and non-limiting embodiment of an onboard radar display 200. In the example, there are displayed three enemy aircraft 202 beyond visual range. In a training scenario, two of the three enemy aircraft may be physically present aircraft operating in the role of enemy aircraft. The third enemy aircraft may be a virtual aircraft with a position and characteristics generated by the gaming engine 108 and transmitted to the training aircraft 102. As a result, the data displayed on the radar scope display 200 of the aircraft 102 is a synthesis of raw or unattenuated data from the onboard sensors 104 showing the two physically present aircraft that is augmented with virtual data representing the virtual enemy aircraft. The data, both real and virtual, is presented in a synthesized manner to the pilot.

The local nature of such onboard sensor systems 104 creates a need to communicate what the onboard sensors 104 are doing to a centralized node 106, such as associated servers, and/or, by extension, to the gaming engine 108. The local sensor systems 104 also may cause actions to occur in the live aircraft 102 and the actions or results of the actions may need to be transmitted to the game engine 108 that is operating the virtual environment. For example, a target tracking sensor system 104 may track a target, lock on the target, loose its lock on the target, guide a weapon to the target, etc. In a training scenario, these targets may be actual aircraft or virtual aircraft. It may be important to get state changes and other feedback from such sensors 104 as well as information relating to actions following the sensor feedback to properly visualize the live action in the virtual environment.

In the example pertaining to acquiring a missile lock and firing on a virtual or real target with a virtual missile, the gaming engine 108 may send updated synthetic sensor data for display on the onboard display systems 110 of the aircraft 102. For example, a gaming engine 108 may communicate directly with sensor 104 or an onboard processor of the aircraft 102 in order to insert virtual data (e.g., data indicative of a virtual asset or object, its characteristics, etc.) into a data stream for display on display system 110. Likewise, the gaming engine 108 may communicate indirectly with the aircraft 102 via the central server 106. Data from the sensors 104 may likewise be transmitted to the gaming engine 108 either directly or via the central server 106.

In a combat scenario, it is common to fire at an enemy aircraft that is often beyond visual range. In some instances, the missile lock may be broken and the missile may fail to make contact with the enemy aircraft. Whether the missile launch is ultimately successful or not, the only feedback to the pilot may be the sound of an explosion or, if within visual range, the sight and sound of an explosion. In other instances, missile impacts may be verified via sensor data indicating that the aircraft has slowed down and is descending rapidly As described more fully below, the gaming engine 108 may operate send both audio and visual data back to the vehicle 102 based on the sensor information such that visualization in a mixed reality environment is accurately portrayed to an operator of the vehicle.

As discussed herein elsewhere, it is important to create a realistic and accurate virtual environment for training an operator of a vehicle 102. When training a fighter pilot, for example, it may be important to realistically and accurately generate and depict interactions between the live aircraft and the virtual environment and assets therein. In the event the pilot fires a virtual missile at an enemy target represented virtually in the mixed reality environment, the mixed reality environment should be augmented to display to the pilot the virtually launching missile, the path in which the missile flies, and an explosion in the event it is estimated that the virtual missile hits the enemy target. For example, a pilot of an aircraft 102 may wear XR or VR goggles or a headset that enables the pilot to see a combination of real and virtual assets and objects in an enhanced virtual environment. As described above, in addition, real and physical representations of virtual objects, such as display elements on a display panel 110 of an aircraft, may be presented to the pilot.

As described above, this process may require over-ride data (e.g., data from a gaming engine 108 that is operating the virtual environment) to be communicated to the aircraft 102 such that the aircraft sensor system 104 is 'tricked' into displaying information to the pilot in reference to a virtual asset in the virtual environment. For example, when a virtual enemy plane is presented in the virtual environment, data may be sent from the game engine 108 to the plane's sensor system 104 to indicate to the pilot that the virtual enemy plane is being identified by the sensor system 104. The plane's weapons tracking system, such as may be embodied in an onboard processor of the aircraft 102, may then react by tracking and locking on the virtual enemy plane. The weapons tracking system may provide the pilot feedback in the usual manner (e.g., by presenting a lock indication to the pilot on internally mounted displays). The weapons tracking system may also communicate its state (e.g., locked on target) to the game engine 108. The pilot may then deploy a virtual missile while the lock is on, and data indicative of the missile launch, and simultaneous lock indication may be sent to the game engine 108. The game engine 108 may than provide, back to the pilot, visual information to be displayed in the pilot's mixed reality head mounted display showing the direction, speed and attitude of the missile along with an explosion indicating a hit. On the other hand, if the pilot deployed the virtual missile when the 'lock' was not on, the visuals presented in mixed reality to the pilot may involve tracking the missile's flight but then not presenting an explosion. Generally, in real combat, the pilot is waiting for an explosion as her indication of a hit. The pilot may have felt they had a lock on the target but in fact did not at the time of firing and this can be represented visually through proper bi-directional communications between the live plane 102 and the game engine 108.

In some embodiments, the virtual environment at least partially viewable by a pilot may include one or more unmanned wingmen. For example, one or more unmanned platforms, such as an unmanned wingman, may be generated and displayed to a pilot. Such unmanned wingman may be presented as operating in a coordinated manner with the pilot's aircraft to achieve mission objectives. Any or all of the actions performed by the pilot including, but not limited to, achieving missile lock, firing missiles, etc., may be performed by an unmanned wingman.

While a lock indication from a weapons tracking system is a good indication that a launched missile will hit the intended target, it is not always going to result in a hit. For example, the missile itself or the launching system may have a defect of some type. Not only could there be problems with the missile, but the adversary could be producing a type of jamming that draws the radar off of the target and hence steers the missile. Such a defective missile launch may be visually depicted to the pilot in mixed reality so she has the visual indications needed to make her next maneuver. Further, an enemy airplane may deploy counter measures confuse the weapons tracking system and/or the missile's tracking system. A mixed reality weapons training system as described herein may represent visual and non-visual counter measures to the pilot of the live airplane such that she understands that the missile launch may be affected, and she should follow certain additional maneuvers. Again, this may be facilitated through a bi-directional communication of live airplane override data and game engine data.

In addition to the real time generation of augmented virtual reality data by the game engine 108 for communication to vehicle platforms, both real time and archived data from the game engine may be displayed to third parties for purpose of analysis. In some embodiments, the actual volume of airspace within which a training access takes place into which one or more actual vehicles are mapped for the purpose of a simulated training exercise may be mapped at a scaled down version into, for example, a room or a subspace of a room 302. For examples, a virtual airspace forming a 100 kilometer by 100 kilometer by 100 kilometer cube within which a number of aircraft are actually or virtually present for the purposes of a simulated exercise may be scaled at a factor of in order to map the virtual airspace to cube of space 302 inside a hanger measuring 10 meters on each side. This interior mapped space 302 may be locked with reference to the fixed structure of the hanger so that individuals 304 may walk around aided by VR glasses 310 such that aircraft positions 306 and other related data 308 from the exercise may be projected within the mapped space 302. This allows for individuals 304 to walk around the space and analyze a replay of the exercise powered by data stored in. for example, server 106. In some embodiments, viewing individuals may be able to interact with the displayed data in order to rewind, fast forward and freeze the simulated exercise data. In some embodiments, individuals may be enabled to interact with the displayed data to, for example, request the display of additional data.

Examples of the sort of data 312 that may be represented as viewable by individuals within the mapped space include, but are not limited to, plane parameters such as altitude, heading, attitude, speed, position on EM/Ps diagrams/curves, weather interaction (contrails, vapor trails, etc.), associated rates of change among all three axes (pitch, roll and yaw) and the like wherein all of these attributes may be displayed in relation to another aircraft. Further examples of data that may be represented as viewable by individuals within the mapped space include representations of weapon types (e.g., air-to-air, air-to-surface, surface-to-air and surface-to-surface, etc.) and attendant attributes and events including, but not limited to, missile launches and tracking, missile tracking state changes (inertial vs. Own ship tracking), missile detonation (impact or proximity fuzing), missile control parameters (e.g., laser guided), missile kinematic capability (High/Nominal termination), missile signature, e.g., Joint Air-to-Surface Standoff Missile (JASSM), weapon options, bombs, decoys/Stand in Jammer like a Miniature Air-Launched Decoy (MALD), guns—ballistic tracking, guns—impact on ground/target, Man-portable air-defense systems (MANPADS)/anti-aircraft artillery (AAA) as well LASERs and directed energy (DE) and the like.

Further examples of data that may be represented as viewable by individuals within the mapped space include representations of weapon sensor systems including, but not limited to, search volumes, track of target(s) and performance degradation. Further examples of data that may be represented as viewable by individuals within the mapped space include representations of counter measures including, but not limited to, physical countermeasures (e.g., flares, chaff, other), electromagnetic measures, and effects or interactions with launched weapons as well as Jammers and jamming. In addition, plane abilities may be represented as viewable by individuals within the mapped space including available change of direction abilities.

In some embodiments, one or more of the viewing individuals 310 may comprise pilots who took part in the exercise that is being viewed via mixed reality. In such instances, it may be advantageous to freeze the displayed at a moment in time in order to demonstrate to the pilot how she may have reacted differently in the presented scenario, In such instances, there may be displayed additional information showing data relevant to alternative scenarios. For example, a cone or other appropriate geometric shape associated with a universe of possible plane trajectories may be displayed. For example, there may be visually displayed a range of options involving trading the instantaneous potential energy of the plane for additional kinetic energy and the resultant volume of space capable of being reached subject to such constraints that may have been options for the pilot in the displayed scenario. The system may allow for an individual to alter an attribute consistent with such constraints and then proceed to display to the pilot how such a choice by the pilot might have played out in the simulated exercise. In such instances, the playback and analysis engine may communicate with the gaming engine to achieve data consistent with an extrapolation into a possible future that take into account the actual historic data of the exercise up to a defined point at which point and extends beyond via predictions that take into account any altered attributes.

In accordance with some exemplary and non-limiting embodiments, system or portion of the system devoted to allowing for the presentation and analysis of archived data generated and/or maintained by the gaming engine may, in real-time or near real-time, operate to interface with the gaming engine. For example, individuals may view a mapped and scaled version of a training exercise while the gaming engine 108 is actively supporting the simulated exercise. While passively viewing the action using VR glasses, an individual, such as an instructor, may interface with a display of an aircraft and designate the occurrence of another enemy aircraft in proximity to the aircraft to be presented. When this designation is communicated to the gaming engine 108, the gaming engine may decide if it is possible to seamlessly insert another enemy aircraft into the simulation. If it is so possible, the gaming engine may incorporate the request into the ongoing exercise. In this manner, instructors may make real-time modifications to the operation of the gaming engine 108.

Figure 4:
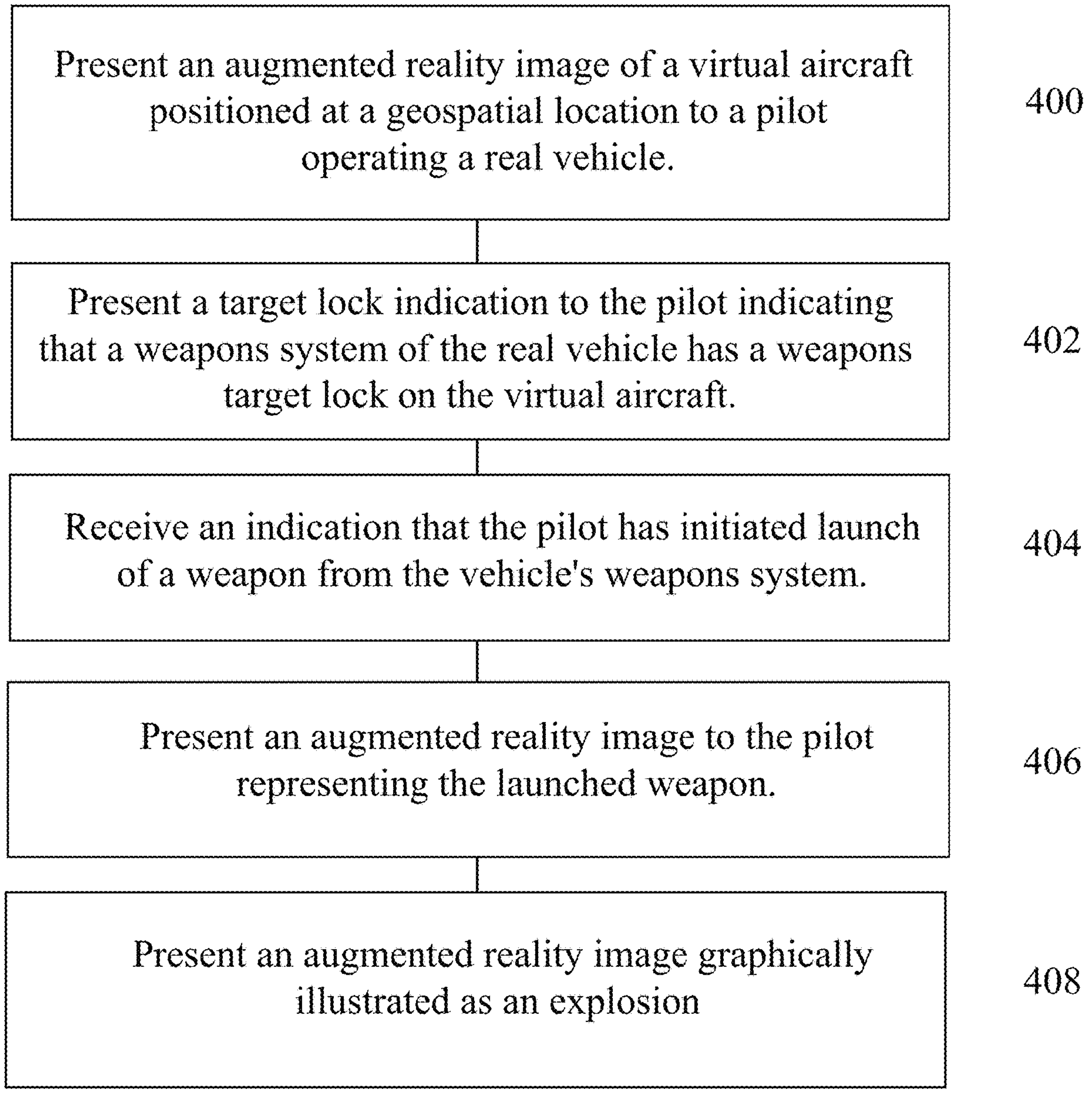
FIG. 4 is an illustration of an exemplary and non-limiting method.

With reference to FIG. 4, there is described in detail an exemplary method for providing augmented reality pilot training involving a target lock as described above. At step 400, an augmented reality image of a virtual aircraft is presented. In some embodiments, the augmented reality image is positioned at a geospatial location to a pilot operating a real vehicle, wherein the virtual aircraft is presented through a head mounted see-through optical system.

At step 402, a target lock indication is presented to the pilot indicating that a weapons system of the real vehicle has a weapons target lock on the virtual aircraft. In some instances, the weapons target lock indication is generated by a simulation computer system executing software simulating a battle scene, in which the pilot is represented, when an indication the simulation computer system indicates that there is an indication of alignment between an ability of a weapon of the weapons system to hit the virtual aircraft.

At step 404, an indication that the pilot has initiated launch of a weapon from the vehicle's weapons system is received. In some instances, the indication of launch initiation is communicated to the simulation computer system and the simulation computer system generates a launched weapon.

At step 406, an augmented reality image representing the launched weapon is presented to the pilot. At step 408, an augmented reality image graphically illustrated as an explosion is presented. In some instances, the explosion is presented based at least in part on an estimated intersection of the virtual weapon and virtual aircraft by the simulation computing system.

With reference to FIG. 5, there is described in detail an exemplary method for providing analysis of training exercise data. At step 500, training exercise data representative of interactions between at least a real aircraft and a virtually presented aircraft that participated in a simulated training exercise is received. Typical examples of such data may include tracked geospatial locations of the real aircraft, tracked geospatial locations of the virtual aircraft, tracked geospatial locations of a launched virtual missile from the real aircraft, a target lock indicating that a weapons system of the real vehicle had a weapons target lock on the virtual aircraft, an indication that the pilot-initiated launch of a weapon from the vehicle's weapons system and an indication of an explosion based at least in part on an estimated intersection of the virtual weapon and virtual aircraft by the simulation computing system.

At step 502, the training exercise data is presented as a three-dimensional battlefield that may be paused and played.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

What is claimed is:

1. A method, comprising:

receiving training exercise data representative of interactions between at least a real aircraft and a virtually presented aircraft that participated in a simulated training exercise, the training exercise data being representative of, during the simulated training exercise, presenting to a pilot operating the real aircraft through a head mounted see-through optical system an augmented reality image of the virtually presented aircraft positioned at a geospatial location wherein the exercise data is selected from the group consisting of tracked geospatial locations of the real aircraft, tracked geospatial locations of the virtual aircraft, tracked geospatial locations of a launched virtual missile from the real aircraft, a target lock indicating that a weapons system of the real vehicle had a weapons target lock on the virtual aircraft, an indication that the pilot-initiated launch of a weapon from the vehicle's weapons system and an indication of an explosion based at least in part on an estimated intersection of the virtual weapon and virtual aircraft by the simulation computing system; and after completion of the simulated training exercise, via mixed reality to one or more viewing individuals, presenting the training exercise data as a three-dimensional battlefield adapted to be paused and played, wherein one or more of the viewing individuals comprise pilots who took part in the simulated training exercise, and wherein the training exercise data is frozen at a moment in time and additional information showing data relevant to alternative scenarios is displayed to demonstrate how a pilot may have reacted differently in the simulated training exercise.

2. The method of claim 1, wherein said training exercise data being representative of at least, during the simulated training exercise, presenting a target lock indication indicating that a weapons system of the real aircraft has a weapons target lock on the virtually presented aircraft, presenting an augmented reality image representing a launched virtual weapon, and presenting an augmented reality image graphically illustrated as an explosion based at least in part on an estimated intersection of the virtual weapon and the virtually presented aircraft by the simulation computing system.

3. The method of claim 2, wherein the weapons lock was based on a real weapons system of the real aircraft after being presented with data indicative of the virtual aircraft as a simulated real aircraft causing the weapons system to interpret the data indicative of the virtual aircraft as real environmentally gathered data.

4. A training system, comprising:

a computer;

a processor in communication with the computer; and a memory in communication with the processor, the memory storing instructions that when executed by the processor cause the processor to:

receive training exercise data representative of interactions between at least a real aircraft and a virtually presented aircraft that participated in a simulated training exercise, the training exercise data being representative of, during the simulated training exercise, presenting to a pilot operating the real aircraft through a head mounted see-through optical system an augmented reality image of the virtually presented aircraft positioned at a geospatial location, wherein the exercise data is selected from the group consisting of tracked geospatial locations of the real aircraft, tracked geospatial locations of the virtual aircraft, tracked geospatial locations of a launched virtual missile from the real aircraft, a target lock indicating that a weapons system of the real vehicle had a weapons target lock on the virtual aircraft, an indication that the pilot-initiated launch of a weapon from the vehicle's weapons system and an indication of an explosion based at least in part on an estimated intersection of the virtual weapon and virtual aircraft by the simulation computing system; and after completion of the simulated training exercise, via mixed reality to one or more viewing individuals, present the training exercise data as a three-dimensional battlefield adapted to be paused and played, wherein one or more of the viewing individuals comprise pilots who took part in the simulated training exercise, and wherein the training exercise data is frozen at a moment in time and additional information showing data relevant to alternative scenarios is displayed to demonstrate how a pilot may have reacted differently in the simulated training exercise.

5. The system of claim 4, wherein the weapons lock was based on a real weapons system of the real aircraft after being presented with data indicative of the virtual aircraft as a simulated real aircraft causing the weapons system to interpret the data indicative of the virtual aircraft as real environmentally gathered data.

6. The system of claim 4, wherein the indication of the pilot-initiated launch is communicated to a simulation computer system to cause the virtual missile to be generated and displayed.

7. The system of claim 4, wherein the weapons lock was based on a computer model of a real weapons system of the real aircraft, wherein the computer model was presented with data indicative of the virtual aircraft as a simulated real aircraft causing the weapons system to interpret the data indicative of the virtual aircraft as real environmentally gathered data.

8. The system of claim 4, wherein said training exercise data being representative of at least, during the simulated training exercise, presenting a target lock indication indicating that a weapons system of the real aircraft has a weapons target lock on the virtually presented aircraft, presenting an augmented reality image representing a launched virtual weapon, and presenting an augmented reality image graphically illustrated as an explosion based at least in part on an estimated intersection of the virtual weapon and the virtually presented aircraft by the simulation computing system.

9. The method of claim 2, wherein the weapons lock was based on a computer model of a real weapons system of the real aircraft, wherein the computer model was presented with data indicative of the virtual aircraft as a simulated real aircraft causing the weapons system to interpret the data indicative of the virtual aircraft as real environmentally gathered data.

10. The method of claim 1, wherein the indication of the pilot-initiated launch is communicated to a simulation computer system to cause the virtual missile to be generated and displayed.

* * * * *